(12) United States Patent
Shimomura

(10) Patent No.: US 6,338,061 B1
(45) Date of Patent: Jan. 8, 2002

(54) SEARCH METHOD SEARCH APPARATUS, AND RECORDING MEDIUM RECORDING PROGRAM

(75) Inventor: Hideki Shimomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/231,495

(22) Filed: Jan. 14, 1999

(30) Foreign Application Priority Data

Jan. 14, 1998 (JP) .......................................... 10-006124

(51) Int. Cl.$^7$ .............................................. G06F 17/30
(52) U.S. Cl. ..................... 707/6; 707/2; 707/5
(58) Field of Search ........................... 707/2, 5, 6, 531, 707/9, 3; 345/326

(56) References Cited

U.S. PATENT DOCUMENTS

| | | | |
|---|---|---|---|
| 4,453,217 A | * 6/1984 | Boivie ............................. | 707/5 |
| 4,916,655 A | * 4/1990 | Ohsone et al. ................... | 707/6 |
| 5,452,451 A | * 9/1995 | Akizawa et al. ................ | 707/6 |
| 5,497,488 A | * 3/1996 | Akizawa et al. ................ | 707/6 |
| 5,606,690 A | 2/1997 | Hunter et al. ................... | 395/605 |
| 5,889,506 A | * 3/1999 | Lopresti et al. ............... | 345/158 |
| 6,009,424 A | * 12/1999 | Lepage et al. .................. | 707/6 |
| 6,018,735 A | * 1/2000 | Hunter ............................ | 707/5 |
| 6,018,736 A | * 1/2000 | Gilai et al. ..................... | 707/6 |

FOREIGN PATENT DOCUMENTS

| | | |
|---|---|---|
| JP | 2-76072 | 3/1990 |
| JP | 3-131969 | 6/1991 |
| JP | 03-152668 | 6/1991 |
| JP | 04-293161 | 10/1992 |
| JP | 04-340164 | 11/1992 |
| JP | 04-340165 | 11/1992 |
| JP | 06-083871 | 3/1994 |
| JP | 08-147320 | 6/1996 |
| JP | 08-194718 | 7/1996 |
| JP | 8-241335 | 9/1996 |
| JP | 09-259140 | 10/1997 |
| JP | 09-288676 | 11/1997 |

OTHER PUBLICATIONS

Minoru Hatada et al., *Spelling Correction Method for English and Katakana in Japanese OCR Text*, IPSJ, vol. 38, 7 (1997), pp. 1317–1327.

Hideki Shimomura et al., *A Fast Approximate String Matching Algorithm Using an Inverted File and Bit–arrays*, ISSN 0919–6072, vol. 97, 85 (1997).

* cited by examiner

*Primary Examiner*—Hosain T. Alam
*Assistant Examiner*—Anh Ly
(74) *Attorney, Agent, or Firm*—Foley & Lardner

(57) ABSTRACT

In a symbol string search method of performing an approximate matching for a target symbol string from a symbol string to be searched by allowing insertion/deletion/replacement of symbols of not more than a designated number of times, the approximate matching is performed by using pieces of transposition information storing appearance positions of symbols in a preformed symbol string to be searched. A symbol string search apparatus and a recording medium recording a symbol string search program are also disclosed.

20 Claims, 10 Drawing Sheets

```
a — 1, 4, 11, 16
b — 5, 12
c — 6, 15
d — 2, 7, 8, 19, 20
e — 3, 13, 17
f — 9, 10, 14, 18
g —
``` p[i]   1 2 3 4 5
       a b a c a   4a

```
a — 1, 4, 11, 16
b — 5, 12
c — 6, 15
``` i ⟨pos[i], chr[i]⟩

| i | pos[i] | chr[i] |
|---|---|---|
| 1 | 1 | a |
| 2 | 4 | a |
| 3 | 5 | b |
| 4 | 6 | c |
| 5 | 11 | a |
| 6 | 12 | b |
| 7 | 15 | c |
| 8 | 16 | a |

Msk (c)

| a | 10101 |
| b | 01000 |
| c | 00010 |
| d | 00000 |
| e | 00000 |
| f | 00000 |
| g | 00000 |

| i | pos[i] | chr[i] | Msk(c) | tmp[0] | tmp[1] | tmp[2] | R'[i,0] | R'[i,1] | R'[i,2] |
|---|---|---|---|---|---|---|---|---|---|
| 0 | 0 | - | - | - | - | - | 00000 | 10000 | 11000 |
| 1 | 1 | a | 10101 | 00000 | 10000 | 11000 | 10000 | 11000 | 11100 |
| 2 | 4 | a | 10101 | 00000 | 10000 | 11100 | 10000 | 11000 | 11100 |
| 3 | 5 | b | 01000 | 10000 | 11000 | 11100 | 01000 | 11100 | 11110 |
| 4 | 6 | c | 00010 | 01000 | 11100 | 11110 | 00000 | 11110 | 11111 |
| 5 | 11 | a | 10101 | 00000 | 10000 | 11000 | 10000 | 11000 | 11100 |
| 6 | 12 | b | 01000 | 10000 | 11000 | 11100 | 01000 | 11100 | 11110 |
| 7 | 15 | c | 00010 | 00000 | 10000 | 11010 | 00000 | 10000 | 11010 |
| 8 | 16 | a | 10101 | 00000 | 10000 | 11010 | 10000 | 11000 | 11101 |

FIG.14 a — #1 : 1, #2 : 4, #2 : 11, #4 : 16
b — #1 : 5, #2 : 12
c — #4 : 6, #4 : 15
d — #5 : 2, #5 : 7, #5 : 8, #7 : 19, #9 : 20
e — #1 : 3, #1 : 13, #2 : 17
f — #4 : 9, #5 : 10, #7 : 14, #7 : 18
g —

FIG.15 i ⟨#id, pos[i], chr[i]⟩

| | | | |
|---|---|---|---|
| 1 | #1 | 1 | a |
| 2 | #1 | 5 | b |
| 3 | #2 | 4 | a |
| 4 | #2 | 11 | a |
| 5 | #2 | 12 | b |
| 6 | #4 | 6 | c |
| 7 | #4 | 15 | c |
| 8 | #4 | 16 | a |

FIG.17

| TARGET SYMBOL STRING = 'aaaa' , PROCESSING TIME ( ms ) | | | |
|---|---|---|---|
| k | 0 | 1 | 2 |
| PRIOR ART | 4.2 | 6.6 | 8.4 |
| PRESENT INVENTION | 0.2 | 0.3 | 0.4 |
| TIME RATIO | 21.0 | 22.0 | 21.0 |

FIG.18

| TARGET SYMBOL STRING = 'abcd' , PROCESSING TIME ( ms ) | | | |
|---|---|---|---|
| k | 0 | 1 | 2 |
| PRIOR ART | 4.2 | 6.6 | 8.4 |
| PRESENT INVENTION | 0.5 | 1.0 | 1.6 |
| TIME RATIO | 8.4 | 6.6 | 5.3 |

SEARCH METHOD SEARCH APPARATUS, AND RECORDING MEDIUM RECORDING PROGRAM

BACKGROUND OF THE INVENTION

1. Field of the Invention

The present invention relates to a method and apparatus for searching a text for a specific character string and a recording medium recording a search program and, more particularly, to a symbol string search method and apparatus useful for an approximate matching (approximate search) technique of searching for similar symbol strings and a recording medium recording a symbol string search program.

2. Description of the Prior Art

Techniques of searching for a specific target symbol string from a large amount of one-dimensional nonstructural symbol string to be searched are used in various fields such as document search and gene sequence search. In practical fields, it is being required not only to increase the speed of search but also to develop an approximate matching technique which searches for a symbol string having certain mismatch as well as a perfectly matched symbol string. For example, on the basis of the principle of finite automaton, Japanese Unexamined Patent Publication No. 2-76072 entitled "Variable Length Character String Detection Apparatus", Japanese Unexamined Patent Publication No. 3-131969 entitled "Symbol String Search Method and Apparatus", and Japanese Unexamined Patent Publication No. 8-241335 entitled "Fuzzy Character String Search Method and System using Fuzzy Nondeterministic Automaton" are proposed. These techniques will be collectively referred to as the prior art 1 hereinafter.

Separately, a technique which performs the approximate matching at a high speed by using sequential operations combining a simple bit shift operation and bit logic operation is proposed (Wu et. al., Fast String Matching Allowing Errors, Communications of the ACM, Vol. 35, No. 10, pp. 88–91). This technique will be referred to as the prior art 2 hereinafter. This prior art 2 will be briefly described below.

Assume that an m-bit target symbol string in an n-bit symbol string to be searched is to be searched for by allowing symbol insertion/deletion/replacement of k times or less. Insertion is mixing of an unnecessary symbol; e.g., 'abccde' has one symbol insertion with respect to 'abcde'. Deletion is missing of a symbol; e.g., 'abde' has one symbol deletion with respect to 'abcde'. Replacement is replacement of a certain symbol with another; e.g., 'abade' has one symbol replacement with respect to 'abcde'.

Let the symbol string to be searched be $T=t[1]t[2]t[3]\ldots,t[n]$ and the target symbol string be $P=p[1]p[2]\ldots,p[m]$. Search is executed by sequentially calculating a two-dimensional array of matching state bit strings $R[i,j]$ ($0 \leq i \leq n$, $0 \leq j \leq k$) each composed of m bits in increasing orders of i and J. $R[i,j]$ indicates "whether matching is successful in the position of the ith symbol in the symbol string to be searched by allowing insertion/deletion/replacement of j times or less". If the xth bit from the start bit of this $R[i,j]$ is 1, this indicates that matching is successful in the position of the ith symbol in the symbol string to be searched by allowing mismatch of j times or less from the start symbol to the xth symbol in the target symbol string. Note that the left bit is the start bit in $R[i,j]$. For example, if $R[10,1]$='11001' during the processing, this indicates that matching is successful in the position of the 10th symbol in the symbol string to be searched by allowing mismatch of one time or less to the first, second, and fifth symbols in the target symbol string. The length of the target symbol string is m. Therefore, if the mth bit of $R[i,j]$ is finally 1, this means that the target symbol string is detected in the position of the ith symbol in the symbol string to be searched by allowing mismatch of j times or less. Recurrence formulas of $R[i,j]$ are $$R[i,j]=B(j) \text{ (for } i=0\text{)} \tag{1-1}$$

$$R[i,j]=\mathit{Sft}(R[i-1,0]) \text{ AND } \mathit{Msk}(t[i]):\text{(for } i>0, j=0\text{)} \tag{1-2}$$

$$R[i,j]=(\mathit{Sft}(R[i-1,j]) \text{ AND } \mathit{Msk}(t[i])) \text{ OR } R[i-j,j-1] \text{ OR } \mathit{Sft}(R[i-1,j-1]) \text{ OR } \mathit{Sft}(R[i,j-1]) \text{ (for } i>0, j>0\text{)} \tag{1-3}$$

B(j) is an m-bit string in which the first j bits are 1s and other bits are 0s, respectively. Sft(R) is an operation of shifting a bit string R to the right by one bit (1 is set in an empty bit). For example, Sft('10010')='11001' for a five-bit string '10010'.

Msk(c) is an m-bit string in which a position where a symbol c exists in a target symbol string is 1 and other bits are 0s, respectively. Msk(c) and a target symbol string are matched from the start bit (leftmost bit). If no symbol c exists in a target symbol string, every bit in Msk(c) is 0. If the symbol c appears a plurality of times in a target symbol string, two or more bits in Msk(c) are 1s, respectively. For example, Msk('a')='10100', Msk('b')='01010', Msk('c')='00001', and Msk('d')='00000' for a target symbol string 'ababc'. "AND" is a logical product of bits, and "OR" is a logical sum of bits.

The prior art 2 can perform search allowing k or less errors (insertion/deletion/replacement) by scanning a symbol string to be searched once in accordance with the above recurrence formulas. The total calculation amount is the sum of a calculation amount o(nk) of $R[i,j]$ and the initialization time for forming Msk(c). The superior characteristic feature of this prior art 2 is that the processing time is reduced in proportion to the length of symbol string to be searched and to the number of allowable mismatched symbols while fuzzy collation is allowed. Also, high-speed processing is possible because the operation amount of recurrence formulas is very small.

One technique of increasing the speed of search of a large amount of symbol strings to be searched is a method using transposition information of a symbol string. This will be referred to as the prior art 3. In this method, a symbol string to be searched itself is not an object of search, and information (transposition information) indicating the position of each symbol in a symbol string to be searched is used in search. During search, only pieces of transposition information corresponding to symbols contained in a target symbol string are acquired from all pieces of transposition information. Symbol string search is performed by checking the position consistency between these acquired pieces of transposition information.

Generally, when the number of types of symbols forming a symbol string to be searched is large and the number of types of symbols contained in a target symbol string is small, the amount of acquired pieces of transposition information is very small compared to that of the original symbol string to be searched. For example, when a very long symbol string composed of several thousands of different symbols such as a Japanese text is searched for a word of a few characters, the amount of acquired pieces of transposition information is far smaller than that of the original document. This yields the following advantages in search using transposition information.

First, compared to search using a whole symbol string to be searched, the amount of data to be acquired for search is small, so the data transfer amount reduces. This increases the processing speed. Especially when a symbol string to be searched has an enormous amount and hence must be placed in a low-speed secondary storage device, a large increase in the processing speed can be expected. Second, search based upon perfect match between symbol strings can be performed by looking up each acquired transposition information at most once. Therefore, the search can be executed within a shorter time period than when a whole symbol string to be searched is scanned.

The problem of prior arts 1 and 2 described above is that the methods are based upon the assumption that a symbol string to be searched is a one-dimensional string, so a very long search time is necessary if the amount of symbol string to be searched is enormous. Especially when a symbol string to be searched has an enormous amount and hence must be placed in a secondary storage of a computer, this symbol string must be entirely transferred to a processing memory to perform search. Additionally, the whole transferred symbol string must be scanned at least once.

The problem of prior art 3 is that the approximate matching for a symbol string cannot be efficiently performed because the method is based only on perfect match between symbol strings. To apply the method to the approximate matching, it is possible to modify a target symbol string to form symbol strings considered to be matched in the approximate matching, repeatedly perform perfect match search by using these symbol strings, and combine the results. To search for a target symbol string 'abcde', for example, five symbol strings 'bcde', 'acde', 'abde', 'abce', and 'abcd' are to be allowed as one-symbol deletion. In addition to these five symbol strings, symbol strings obtained by insertion and replacement and all possible cases of symbol insertion/deletion/replacement to a desired number of times must be taken into consideration. Under the conditions, search is repeated, and the results are combined. Unfortunately, this processing produces an enormous number of symbol strings and hence is very time-consuming. The number of symbol strings can be more or less decreased by introducing a normal expression (e.g., 'ab*cd' is considered to be matched although "*" is an arbitrary character) such as a wild card which matches any symbol. However, a large increase in processing time is still unavoidable.

SUMMARY OF THE INVENTION

The present invention has been made to solve the above problems of the prior arts, and has as its object to provide a fuzzy symbol string search method and apparatus capable of efficiently searching for a symbol string by using transposition information of a symbol string to be searched, and a recording medium recording a symbol string search program.

To achieve the above object, according to one aspect of the present invention, an approximate matching is executed by performing fuzzy collation with a target symbol string by using transposition information of a symbol string to be searched.

According to another aspect of the present invention, an approximate matching is efficiently performed by acquiring only pieces of transposition information of the same symbols as contained in a target symbol string from preformed and prestored pieces of transposition information of a symbol string to be searched, and scanning the acquired pieces of transposition information at least once or just once.

According to still another aspect of the present invention, an approximate matching is efficiently performed by acquiring pieces of transposition information of the same symbols as contained in a target symbol string and scanning the acquired pieces of transposition information just once. To this end, regardless of whether the acquired pieces of transposition information are continuous or discontinuous in an original symbol string to be searched, information indicating the matching state of a symbol string with respect to each of the acquired pieces of transposition information is efficiently calculated.

The present invention having the above aspects can rapidly execute the approximate matching for a very long symbol string to be searched.

The first reason is that not pieces of transposition information of a whole symbol string to be searched but only pieces of transposition information corresponding to symbols contained in a target symbol string are acquired for search. This reduces the data transfer time required for the processing compared to a method in which pieces of transposition information of a whole symbol string to be searched are acquired.

The second reason is that the approximate matching allowing mismatch of a predetermined number of times can be efficiently executed by scanning the acquired pieces of transposition information only once while a bit operation with a small calculation amount is repeated.

Especially when a symbol string to be searched has a very large amount and hence is placed in a secondary storage of a computer or when the number of types of symbols forming a symbol string to be searched is large and the number of types of symbols contained in a target symbol string is comparatively small, a great increase in search speed is achieved. For example, although Japanese texts contain several thousands of different symbols, these texts are often searched for a word composed of a relatively small number of characters. The present invention well achieves its effect in a case like this.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 14 is a view showing examples of transposition information in the transposition information storage unit;

FIG. 15 is a view showing an output from the transposition information arrangement unit;

FIGS. 17 and 18 are views showing the effect of the present invention by comparing the present invention with one prior art.

DETAILED DESCRIPTION OF THE PREFERRED EMBODIMENT

A preferred embodiment of the present invention will be described in detail below with reference to the accompanying drawings.

Figure 1:
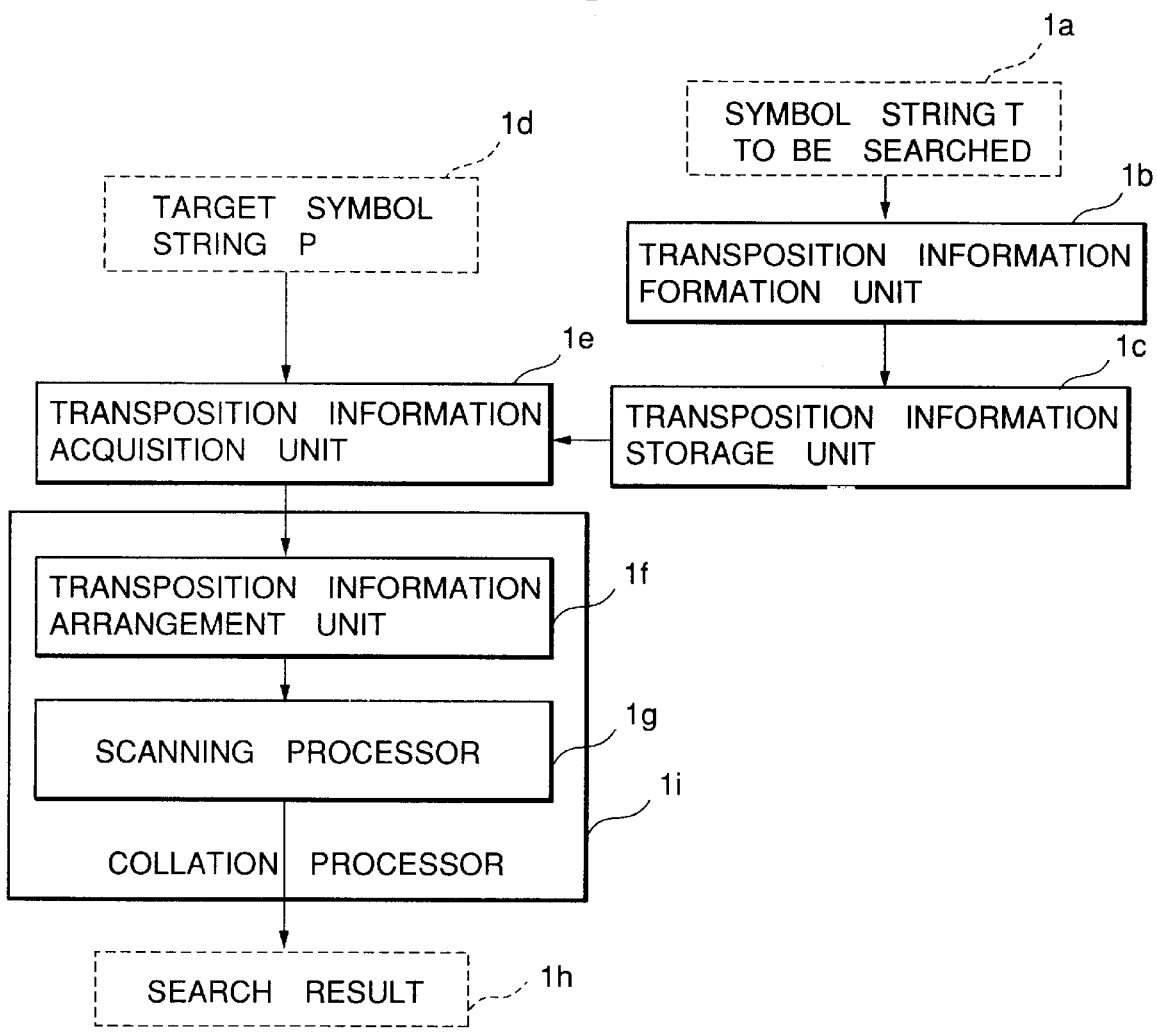
FIG. 1 is a block diagram showing an arrangement according to the first embodiment of the present invention.

One embodiment of the present invention will be described below with reference to FIG. 1. Prior to an explanation, the search conditions will be described below. That is, a symbol string T to be searched has a length n and is composed of symbols t[1] to t[n]. A target symbol string P has a length m and is composed of symbols p[1] to p[m]. An approximate matching for all target symbol strings contained in the symbol string to be searched is performed by allowing insertion/deletion/replacement of k (designated number) times or less.

Figure 2:
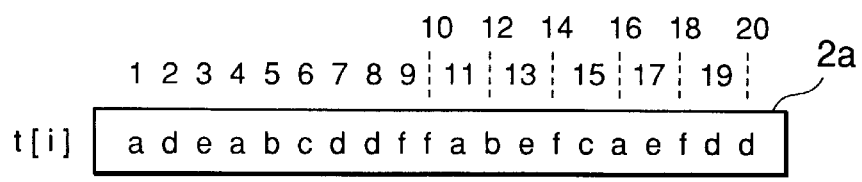
FIG. 2 is a view showing an example of a symbol string to be searched.
Figures 3, 4, 5, 6:
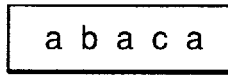
FIG. 3 is a view showing examples of transposition information stored in a transposition information storage unit.
FIG. 4 is a view showing an example of a target symbol string.
FIG. 5 is a view showing an output from a transition information acquisition unit.
FIG. 6 is a view showing an output from a transposition information arrangement unit.

First, formation of transposition information will be described below. Transposition information stored in a transposition information storage unit 1c is previously formed from a symbol string 1a to be searched by a transposition information formation unit 1b. This transposition information indicates a position where a corresponding symbol appears in the symbol string to be searched. 2a in FIG. 2 denotes one example of the symbol string 1a to be searched in which t[1]='a', t[2]='d', ..., t[20]='d'. FIG. 3 shows examples of transposition information corresponding to 2a in FIG. 2. For example, these pieces of transposition information indicate that a symbol 'a' appears in the positions of 1, 4, 11, and 16 of the original symbol string to be searched and a symbol 'g' never appears in the symbol string. In this embodiment, pieces of transposition information are stored such that the appearance positions of each symbol are arranged in increasing order. Accordingly, transposition information of each symbol can be efficiently obtained in a later search process.

Next, symbol string search will be described. When a target symbol string id is input, a transposition information acquisition unit 1e acquires pieces of transposition information of the same symbols as contained in the target symbol string from the transposition information storage unit 1c. 4a in FIG. 4 denotes one example of the target symbol string ld in which p[1]='a', p[2]='b', ..., p[5]='a'. FIG. 5 shows examples of the transposition information acquired from the data structure shown in FIG. 3 of the transposition information storage unit by the transposition information acquisition unit 1e. If identical symbols exist in a target symbol string, transposition information of these symbols needs to be acquired only once. This transposition information acquisition unit 1e must acquire transposition information corresponding to each symbol in the target symbol string by searching the transposition information storage unit 1c. However, any conventional representative search speed increasing technique such as a hash table method or binary search can also be applied.

A collation processor 1i uses the acquired pieces of transposition information to perform the approximate matching by allowing mismatch of some symbols. The search result is output as, e.g., the position of a found symbol string in the symbol string to be searched (a plurality of positions if a plurality of symbol strings are found). In this embodiment, the collation processor 1i comprises a transposition information arrangement unit 1f and a scanning processor 1g. These units will be described below.

The transposition information arrangement unit if rewrites each transposition information into a set of <appearance position,symbol> and arranges these sets in increasing order of appearance position. FIG. 6 shows the pieces of transposition information in FIG. 5 arranged by the transposition information arrangement unit 1f. The ith transposition information after the arrangement is expressed as <pos[i],chr[i]> which means that a symbol chr[i] exists in a position pos[i] in the original symbol string to be searched. For example, a symbol 'a' has different pieces of transposition information <1,a>,<4,a>, <11,a>, and <16,a>. This indicates that "a" is contained in 1, 4, 11, and 16 of the original symbol string to be searched. When pieces of transposition information corresponding to different symbols are arranged in increasing order of appearance position as shown in FIG. 5, these pieces of transposition information are merged while the individual orders are maintained. This is more efficient than collectively arranging these pieces of transposition information.

The scanning processor 1g scans the arranged pieces of transposition information once to perform fuzzy collation allowing mismatch of k times or less, and outputs the result. This method will be described below.

Figure 7:
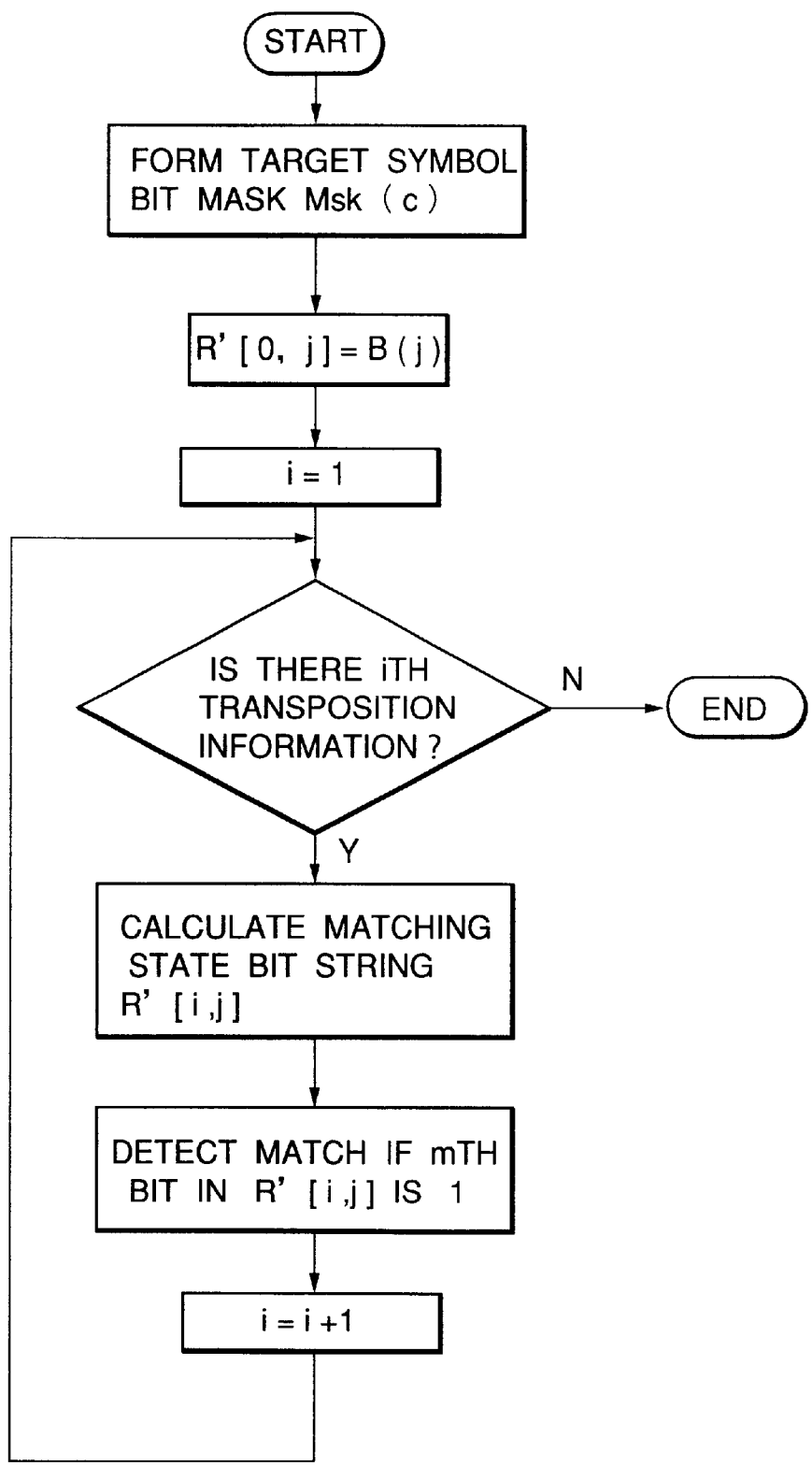
FIG. 7 is a flow chart showing processing performed by a collation processor.

The ith transposition information after the arrangement corresponds to a symbol positioned in pos[i] of the original symbol string to be searched. Accordingly, R' represented by $$R'[i,j]=R[pos[i],j] \quad (2)$$

is defined for the ith transposition information. If a symbol string match is detected in R'[i,j], this means that a symbol match is detected in pos[i] of the original symbol string to be searched. This is possible if R'[i,j] can be recurrently calculated while i is increased. FIG. 7 is a flow chart of the scanning processor 1g based on this concept.

Figures 8, 9:
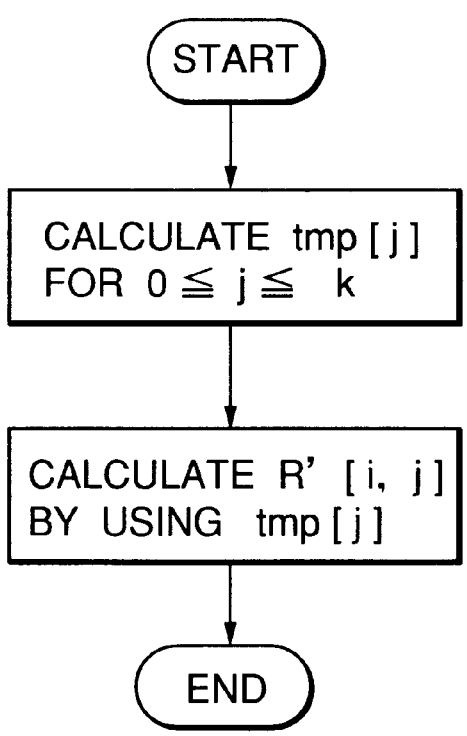
FIG. 8 is a view showing an example of a search symbol bit mask.
FIG. 9 is a flow chart showing a process of calculating a matching state bit string.

First, a target symbol bit mask Msk(c) corresponding to the target symbol string is formed. This Msk(c) is exactly the same as in prior art 2 and has the same length m as the target symbol string. A bit in a position where a character c appears in the target symbol string is 1, and other bits are 0s, respectively. FIG. 8 shows Msk(c) corresponding to the target symbol string 4a shown in FIG. 4. For example, "a" appears in the first, third, and fifth positions in the target symbol string, so the corresponding bits are 1s, respectively.

Next, R'[0,j] is set as an initial value of a sequential calculation. Letting pos[0]=0, and $$R'[0,j]=R[pos[0],j]=R[0,j]=b(j) \quad (3\text{-}1)$$

is substituted in accordance with equation (1-1).

After that, while i is increased from 1, matching state bit strings R'[i,j] corresponding to all pieces of transposition information are calculated to find a symbol string match. As in prior art 2, it is determined in a position of this R'[i,j] where the mth bit is 1 that a character string is found by allowing mismatch of j times or less. That is, a character string is detected by allowing a mismatch of j characters or less in the position pos[i] of the original symbol string to be searched.

FIG. 9 is a flow chart for calculating [i,j]. A temporary variable array tmp[j] is formed before calculation of R'[i,j], and R'[i,j] is calculated by using this tmp[j]. This tmp[j] is an m-bit array and means substitution of a value corresponding to a matching state bit string R[pos[i]−1,j] in a position pos[i]−1 of the original symbol string to be searched. That is, for R"[i,j] to be calculated (i.e., R[pos[i],j]), tmp[j] is the value of a matching state bit string corresponding to an immediately before symbol position in the original symbol string to be searched. If tmp[j] is R[pos[i]−1,J], R'[i,j] can be calculated from equations (1-2) and (1-3) as follows.

$$R'[i,j]=Sft([tmp[0]) \text{ AND } Msk(chr[i]) \text{ if } i>0, j=0 \quad (3\text{-}2)$$

$$=(Sft(tmp[j]) \text{ AND } Msk(chr[i])) \text{ OR } Sft(tmp[j-1] \text{ OR } tmp[j-1] \text{ OR } Sft(R'[i,j-1] \text{ if } i>0, j>0 \quad (3\text{-}3)$$

Figure 10:
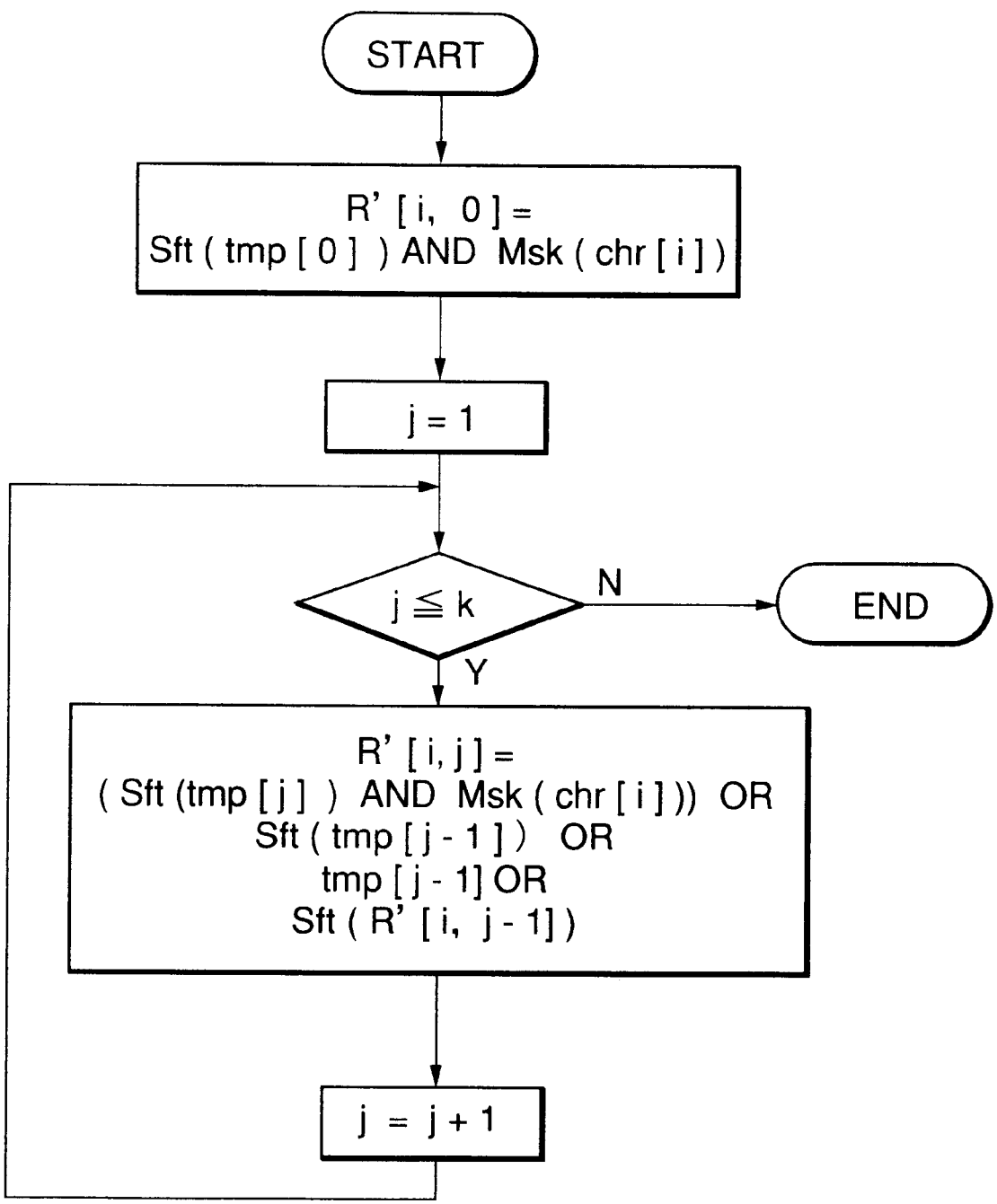
FIG. 10 is a flow chart showing a process of calculating tmp[j] used in the calculation of the matching state bit string.

FIG. 10 is a flow chart showing a process of calculating R'[i,j] by using tmp[j]. For j=0, R'[i,0] is calculated in accordance with equation (3-2). In other cases, R'[i,j] is calculated in accordance with equation (3-3).

A method of calculating tmp[j] will be described next. As described above, a value corresponding to the matching state bit string R[pos[i]−1,j] in the original symbol string to be searched is substituted into tmp[j].

Consider first the calculation of the matching state bit string R in the original symbol string to be searched. Assume that R[x,j] is calculated in a certain position x in the original symbol string to be searched. Assume also that all bits in Msk(t[x+1]) to Msk(t[x+d]) are 0s in positions x+1 to x+d, respectively, i.e., no character strings contained in a target symbol string appear in t[x+1] to t[x+d]. Accordingly, defining equations (1-2) and (1-3) of R[i,j] are simplified as follows for i=x+1. That is, equation (1-2) is simplified as $$R[x+1,0]=Sft(R[x,0]) \text{ AND } Msk(t[x+1])=b(0) \quad (4)$$

Equation (1-3) is simplified as $$R[x+1,j]=(Sft(R[x,j]) \text{ AND } Msk(t[x+1])) \text{ OR } R[x,j-1] \text{ OR } Sft(R[x,j-1]) \text{ OR } Sft(R[x+1,j-1])=R[x,j-1] \text{ OR } Sft(R[x,j-1]) \text{ OR } Sft(R[x+1,j-1]) \quad (5)$$

This equation (5) is sequentially calculated for j=1, 2, . . . Since the start bit of Sft(R) for given R is 1, (Sft(R) OR b(1))=Sft(R) holds, and $$R[x+1,1]=R[x,0] \text{ OR } Sft(R[x,0]) \text{ OR } Sft(R[x+1,0])=R[x,0] \text{ OR } Sft(R[x,0]) \text{ OR } b(1) =R[x,0] \text{ OR } Sft(R[x,0]) \quad (6)$$

$$R[x+1,2]=R[x,1] \text{ OR } Sft(R[x,1]) \text{ OR } Sft(R[x+1,1])=R[x1] \text{ OR } Sft(R[x,1]) \text{ OR } Sft(R[x,0]) \text{ OR } Sft(R[x,0]))=R[x,1] \text{ OR } Sft(R[x,1] \text{ OR } R[x,0] \text{ OR } Sft(R[x,0])) \quad (7)$$

From equation (1-3), R[i,j] is originally $$R[i,j]=(Sft(R[i-1,j]) \text{ AND } Msk(t[i])) \text{ OR } R[i-1,j-1] \text{ OR } Sft[i-1,j-1] \text{ OR } Sft[R(i,j-1)]$$

i.e., contains Sft[R(i,j−1)] as a logical sum. This means that $$R[i,j] \text{ OR } Sft(R[i,j-1])=R[i,j] \quad (8)$$

holds, so equation (7) is rewritten as $$R[x+1,2]=R[x,1] \text{ OR } Sft(R[x,1] \text{ OR } R[x,0] \text{ OR } Sft(R[x,0]))=R[x,1]$$

OR Sft(R[x,1] OR R[x,0])=R[x,1] OR Sft(R[x,0] OR Sft(R[x,1])=R[x,1] OR Sft(R[x,1])) (9)

This similarly holds for j=3, 4, . . . Generally, R[x+1,j] (j≧2) is described by $$R[x+1,j]=R[x,j-1] \text{ OR } Sft(R[x,j-1] \text{ OR } R[x,j-2] \text{ OR } Sft(R[x,j2]))=$$

$$R[x,j-1] \text{ OR } Sft(R[x,j-1] \text{ OR } R[x,j-2])=R[x,j-1] \text{ OR } Sft(R[x,j-2]) \text{ OR } Sft(R[x,j-1])=R[x,j-1] \text{ OR } Sft(R[x,j-1]) \quad (10)$$

When equation (6) is also taken into consideration, equation (10) holds for j≧1.

Separately, $$f(R)=Sft(R) \text{ OR } R \quad (11)$$

$$fy(R)=f(f(f \ldots (f(R) \ldots ))):\text{apply } f \text{ to } R \text{ y times} \quad (12)$$

are defined, and R[x+d,j] is calculated by using Msk(c) which is 0 between x+1 to x+d and equation (10) which holds for j≧1. This calculation derives $$R[x+d,j]=f(R[x+d-1,j-1])=f(f(R[x+d-2,j-2])=f2(R[x+d-2,j-2])=f(f2(R[x+d-3,j-3])=f3(R[x+d-3,j-3])=\ldots =fy(R[x+d-y,j-y]) \quad (13)$$

As a consequence, if the value of R[x+d−y,j−y] is known, R[x+d,y] can be calculated by repeatedly performing the operation f for this value y times. It is assumed that for j≧d, the value of R[x,j−d] corresponding to y=d is already calculated. Therefore, R[x+d,j] can be calculated by repeatedly performing the operation f for this value d times. For j<d, R[x+d,j] can be calculated by repeatedly performing the operation f for R[x+d−j,0], which corresponds to y=j, j times. However, as discussed earlier in equation (4), R[x+d−j,0] is b(0) from assumption Msk(t[x+d−j])=b(0). Therefore, from the property of the operation that f(R)=Sft(R) OR R, when f is repeatedly performed for f j times, the first j bits become 1, i.e., b(j). The foregoing is summarized as $$R[x+d,j]=fy(R[x+d-y,j-y]) \text{ (for } j \geq d\text{)} \quad (14\text{-}1)$$

$$R[x+d,j]=b(j) \text{ (for } j<d\text{)} \quad (14\text{-}2)$$

The method of directly calculating the value of R[x+d,j] when R[x,j] is known and Msk(c) is b(0) between x+1 and x+d by omitting calculations for x+1 to x+d−1 has been described above.

Next, this concept will be applied to the calculation of tmp[j]=R[pos[i]−1,j] which is used to calculate R'[i,j]. It is obvious from the property of the process of acquiring transposition information that a matching state bit string known before tmp[j]=R[pos[i]−1,j] is R'[i−1,j]=R[pos[i−1], j] and no characters contained in the target symbol string exist between pos[i−1]+1 and pos[i]−1, so Msk(c)=b(0). If d=pos[i]−pos[i−1]−1, Msk(c)=b(0) between pos[i−1]+1 and pos[i−1]+d. Therefore, by using equations (14-1) and (14-2) by letting x=pos[i−1] and d=pos[i]−pos[i−1]−1, tmp[j]=R[pos[i]−1,j] can be calculated when R'[i−1,j]=R[pos[i−1],j] is known. Also, the above discussion takes only d≧1 into consideration. When d=0, i.e., when continuous symbols in the original symbol string to be searched are to be processed, it is only necessary to directly substitute tmp[j]=R'[i−1,j].

Figure 11:
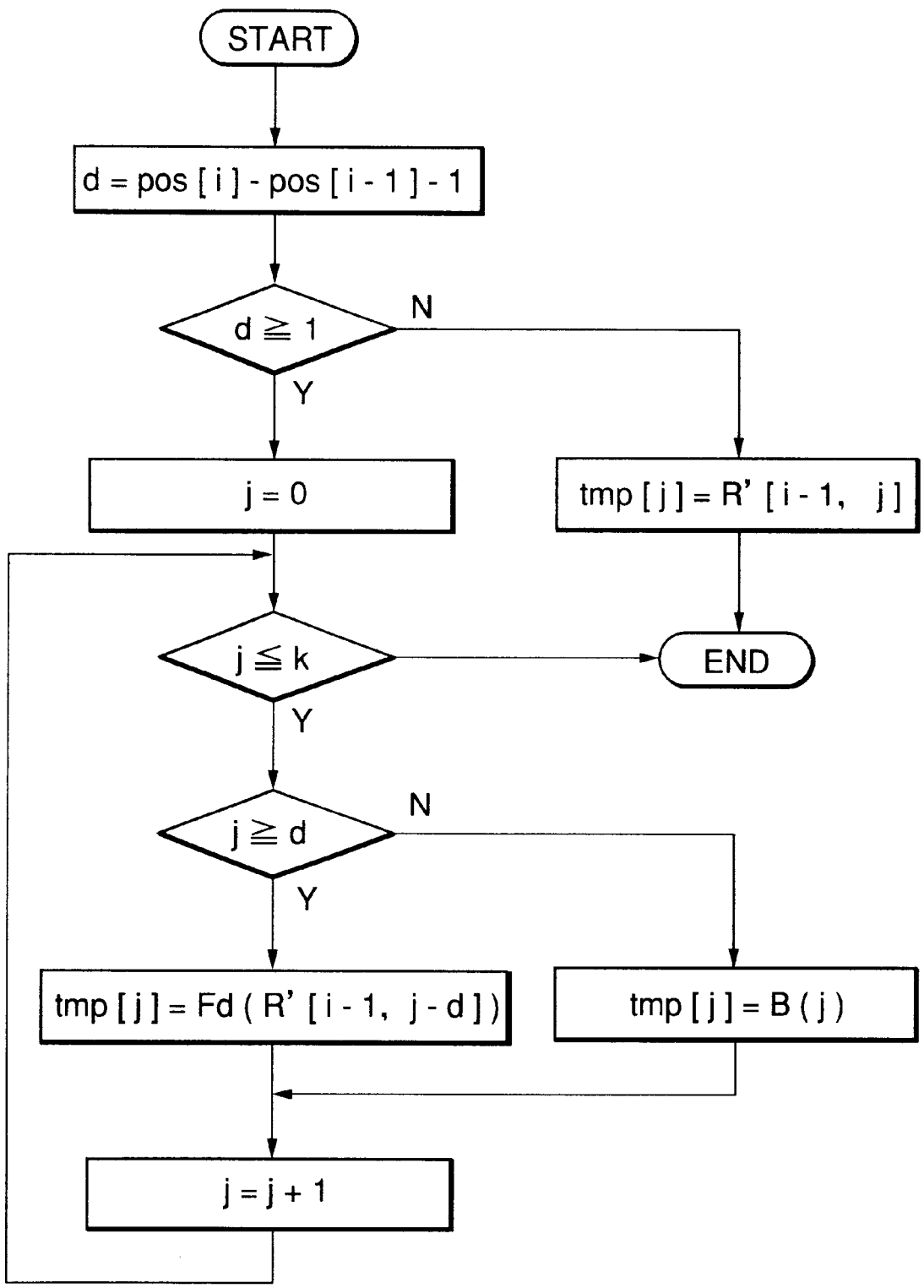
FIG. 11 is a flow chart pertaining to the matching state bit string calculation using tmp[j]

FIG. 11 is a flow chart for calculating tmp[j] on the basis of the above discussion. First, an initializing unit sets the value of d, and, if d does not satisfy d≧1, i.e., if d=0, R'[i−1,j]=R[pos[i]−1,j] is directly substituted into tmp[j]. If d≧1, the process of calculating tmp[j] is repeatedly executed for all values of j satisfying 0≧j≧k. As discussed earlier, if j≧d, tmp[j] is calculated by repeatedly performing the process f for R'[i−1,j−d]d times. If not, i.e., if j<d, b(j) is substituted into tmp[j].

Figures 12, 13:
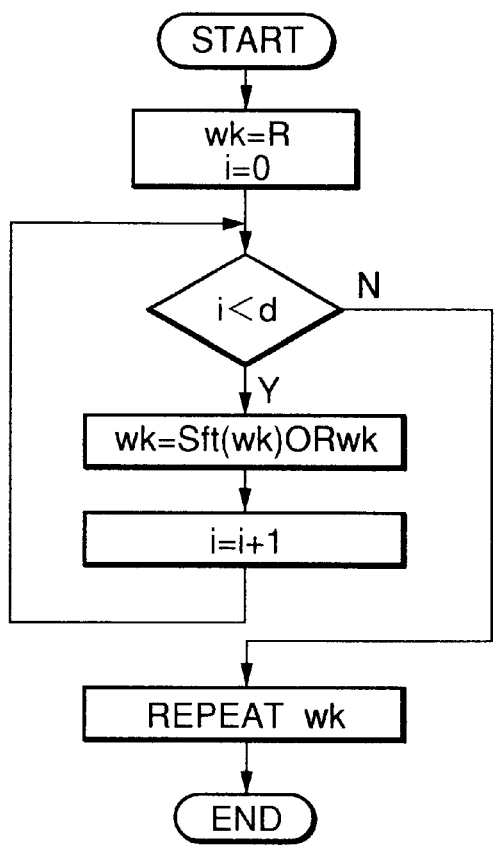
FIG. 12 is a flow chart of a process of repeating an operation a predetermined number of times.
FIG. 13 is a view showing examples of the matching state bit string and tmp[j]
Figure 16:
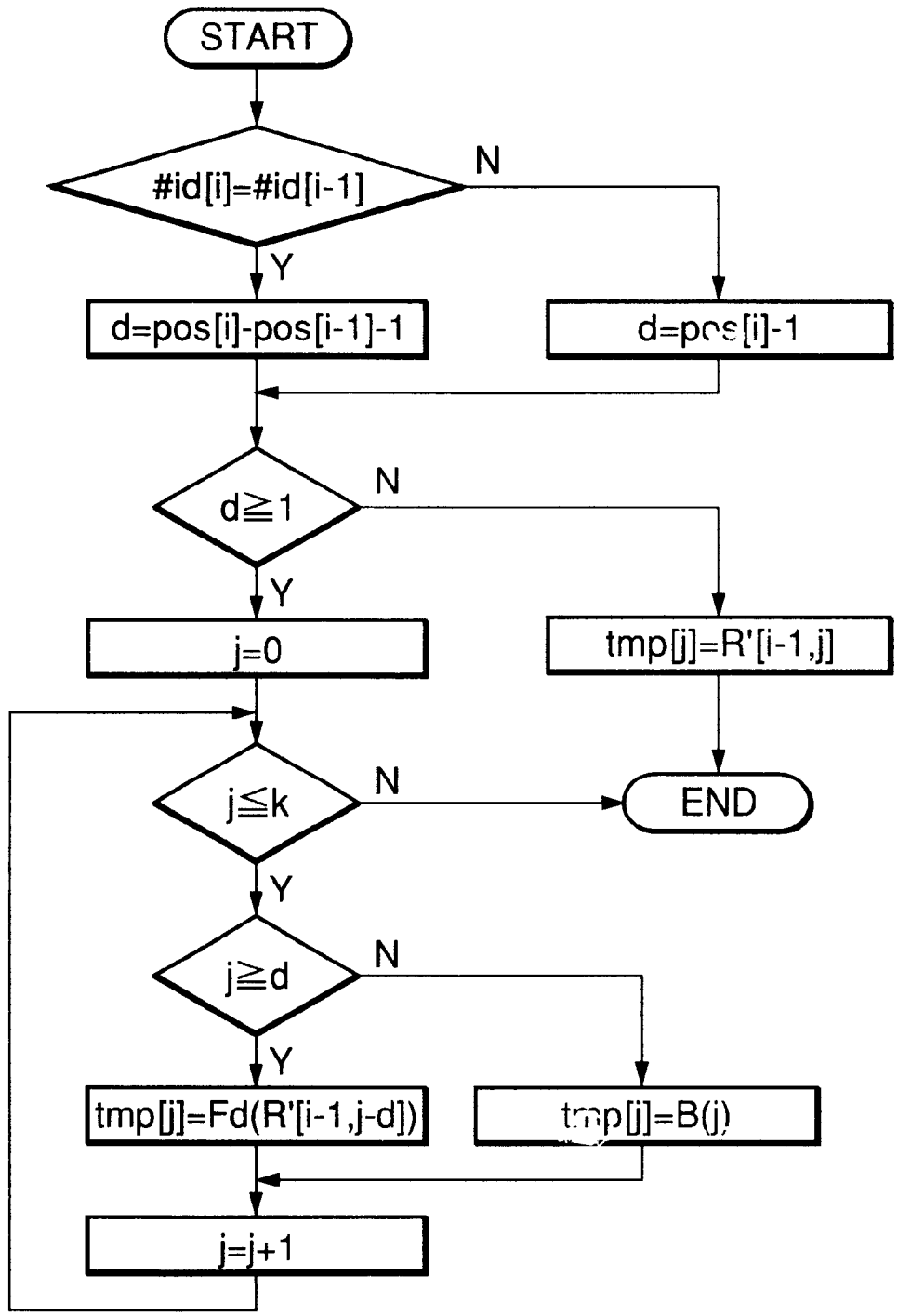
FIG. 16 is a flow chart showing a process of calculating tmp[j] used in the calculation of the matching state bit string.

FIG. 12 is a flow chart showing a process of repeating the process f(R)=Sft(R) OR R d times. R is once substituted into a variable wk, and shift and a logical sum operation of wk are repeatedly performed for the result d times.

If the mth bit of R'[i,j] sequentially calculated on the basis of the aforementioned method is found to be 1, this means that the approximate matching meeting the conditions is executed.

FIG. 13 shows the values of R'[i,j] and tmp[j] when search is executed in accordance with this embodiment described so far. FIG. 13 shows a process of searching the symbol string 2a to be searched shown in FIG. 2 for the target symbol string 4a shown in FIG. 4 by allowing insertion/deletion/replacement up to two times. Pos[i] and chr[i] are a pair of pieces of transposition information, R'[i,j] is a matching state bit string, and tmp[j] is a temporary variable used to calculate R'[i,j]. Msk(c) indicates Msk(chr[i]) to simplify the explanation.

First, R'[0,j] for i=0 is set as an initial value. From equation (4), R'[0,j]=b(j). After that, tmp[j] and R'[i,j] are sequentially calculated in accordance with the flow charts shown in FIGS. 9, 10, and 11.

Since d=pos[1]−pos[0]−1=0 for i=1, tmp[j]=R'[0,j]. So, R'[1,j] is calculated by $R'[1,0]=Sft(tmp[0])$ AND $Msk('a')$='10000' AND '10101'='10000'

$R'[1,1]=(Sft(tmp[1])$ AND $Msk('a'))$ OR $Sft(tmp[0])$ OR $tmp[0]$
  OR $Sft(R'[1,1])$=('11000' AND '10101') OR '10000' OR
  '00000' OR '11000'='11000'

$R'[1,2]=(Sft(tmp[2])$ AND $Msk('a'))$ OR $Sft(tmp[1])$ OR $tmp[1]$
  OR $Sft(R'[1,1])$=('11100' AND '10101') OR '11000' OR
  '10000' OR '11100'='11100'

Next, calculations are performed for i=2. Since d=pos[2]−pos[1]−1=2, tmp[j]=b(j) when j is smaller than 2, and tmp[j]=f2(R'[1,j−2]) when j is 2 or more. Therefore, tmp[0]='00000', tmp[1]='10000', and tmp[2]='11100'. So, R'[2,j] is calculated by $R'[2,0]=Sft(tmp[0])$ AND $Msk('a')$='10000' AND '10101'='10000'

$R'[2,1]=(Sft(tmp[1])$ AND $Msk('a'))$ OR $Sft(tmp[0])$ OR $tmp[0]$
  OR $Sft(R'[2,0])$=('11000' AND '10101') OR '10000' OR
  '00000' OR '11000'='11000'

$R'[2,2]=(Sft(tmp[2])$ AND $Msk('a'))$ OR $Sft(tmp[1])$ OR $tmp[1]$
  OR $Sft(R'[2,1])$=('11110' AND '10101') OR '11000' OR
  '10000' OR '11100'='11100'

Calculations are then performed for i=3. Since d=pos[3]−pos[2]−1=0, tmp[j]=(R'[2,j]). So, R'[3,j] is calculated by $R'[3,0]=Sft(tmp[0])$ AND $Msk('b')$='11000' AND '01000'='01000'

$R'[3,1]=(Sft(tmp[1])$ AND $Msk('b'))$ OR $Sft(tmp[0])$ OR $tmp[0]$
  OR $Sft(R'[3,0])$=('11100' AND '01000') OR '11000' OR
  '10000' OR '10100'='11100'

$R'[3,2]=(Sft(tmp[2])$ AND $Msk('b'))$ OR $Sft(tmp[1])$ OR $tmp[1]$
  OR $Sft(R'[3,1])$=('11110' AND '01000') OR '11100' OR
  '11000' OR '11110'='11110'

Finally, calculations are performed for i=4. Since d=pos[4]−pos[3]−1=0, tmp[j]=(R'[3,j]). So, R'[4,j] is calculated by $R'[4,0]=Sft(tmp[0])$ AND $Msk('c')$='10100' AND '00010'='00000'

$R'[4,1]=(Sft(tmp[1])$ AND $Msk('c'))$ OR $Sft(tmp[0])$ OR $tmp[0]$ OR
  $Sft(R'[4,0])$=('11110' AND '00010') OR '10100' OR '01000'
  OR '10000'='11110'

$R'[4,2]=(Sft(tmp[2])$ AND $Msk('c'))$ OR $Sft(tmp[1])$ OR $tmp[1]$ OR
  $Sft(R'[4,1])$=('11111' AND '00010') OR '11110' OR '11100'
  OR '11111'='11111'

Since the fifth bit of R'[4,2] is 1, the target symbol string 'abaca' is found in this position by allowing insertion/deletion/replacement of two times or less. Also, pos[4]=6 indicates that the position is the sixth symbol in the original symbol string to be searched. The target symbol string 'abaca' matches 'abc' as the fourth to sixth symbols in the symbol string to be searched by allowing deletion of the third and fifth 'a's.

All target symbol strings existing in the symbol string to be searched can be found by repeating the above processing. In this embodiment, search was successful by allowing a mismatch of two times or less even when i=8 and pos[i]=16. That is, the target symbol string 'abaca' matched 'abefca' as the 11th to 16th symbols in the symbol string to be searched by allowing a mismatch of two times, i.e., replacement of the third 'e' with 'a' and insertion of 'f' immediately after that. A plurality of interpretations are sometimes possible for one combination of insertion/deletion/replacement. For example, the above case can also be interpreted that the third 'a' is replaced by 'f' and 'e' is inserted immediately before that. However, either interpretation indicates a mismatch of two times or less.

In the above embodiment, the number of symbol strings to be searched is 1. However, in some instances, a plurality of symbol strings to be searched are present and a user wants to know from which symbol string to be searched a target symbol string is found. One example is a case in which a user searches a plurality of documents in a document database and wants to know in which position of which document a target symbol string exists.

The following modification makes this processing feasible. That is, when forming transposition information, the transposition information formation unit 1a shown in FIG. 1 stores not only position information in a symbol string to be searched but also information for identifying the symbol string to be searched. This information will be called "symbol string identification information". FIG. 14 shows the way the position information and symbol string identification information are stored. Referring to FIG. 14, #id of #id:pos indicates the symbol string identification information, and pos of #id:pos indicates the position information in this symbol string to be searched. In this modification, a numerical value is used as #id. Next, the transposition information arrangement unit 1f forms three sets of data <#id[i],pos[i],chr[i]> including the symbol string identification information and arranges readout pieces of transposition information in the priority orders of #id[i] and pos[i]. FIG. 15 shows pieces of transposition information acquired when the symbol string 4a to be searched shown in FIG. 4 is searched for the pieces of transposition information shown in FIG. 14. Instead of calculating d=pos[i]−pos[i−1]−1 during the calculation of tmp[j] shown in the flow chart of FIG. 11, the collation processor calculates d=pos[i]−1 if #id[i] differs from #id[i−1].

When the processing explained in the above embodiment is performed in accordance with the above modification, the identification information #id is output in addition to the position information when a symbol string is detected. Consequently, a plurality of symbol strings to be searched can be processed.

A symbol string to be searched and a target symbol string can be, e.g., input character strings from a keyboard, character strings recognized by character recognition, or character strings recognized by voice recognition. A large amount of symbol string such as a gene sequence can also be processed. The technique of the present invention is particularly effective for a symbol string to be searched or target symbol string formed by a character or voice recognition technique because errors cannot be completely removed from such a symbol string.

Also, the present invention remains effective even when the symbol string generation method and apparatus according to the present invention are practiced on a computer by forming programs which realize the above functions on the computer and recording the formed programs in a computer-readable recording medium.

The approximate matching for a very long symbol string to be searched can sometimes be executed at a high speed. The first reason is that not pieces of transposition information of a whole symbol string to be searched but only pieces of transposition information corresponding to symbols contained in a target symbol string are acquired for search, so the data transfer time necessary for the processing is smaller than when pieces of transposition information of the whole symbol string to be searched are acquired. The second reason is that the approximate matching allowing a mismatch of k times or less can be efficiently executed by scanning the acquired pieces of transposition information just once while bit operations with a small calculation amount are repeated. A large increase in processing speed is achieved especially when a symbol string to be searched has a large amount and hence is placed in a secondary storage of a computer or when the number of types of symbols forming a symbol string to be searched is large and a target symbol string is comparatively short.

FIGS. 17 and 18 show the results of experiments backing up the effect of the present invention. The processing times of the approximate matching for a random symbol string containing (26 types of) 10,000 lowercase English letters were measured. "PRIOR ART" indicates the fuzzy collation method of prior art 2, and "PRESENT INVENTION" indicates the method of the present invention. In each table, "k" indicates the number of times of allowable insertion/deletion/replacement. The experiments were conducted by executing a program described in the C language on a commercially available workstation (WS4800/460 (trademark): manufactured by NEC Corp).

FIG. 17 shows the processing times when a target symbol string was 'aaaa'. The processing time of the present invention greatly reduced to 1/21 to 1/22 of that of the prior art. This can be explained that the amount of pieces of transposition information acquired from the target symbol string was smaller than that acquired from the whole symbol string to be searched, and this reduces the data transfer time and the collation time. In this experiment, only one type of symbol 'a' of 26 different lowercase English letters was contained in the target symbol string. Theoretically, therefore, the amount of acquired pieces of transposition information is 1/26 of that of the original transposition information. Accordingly, the search time can be greatly reduced even if there is a slight overhead in the process of arranging or scanning the acquired pieces of transposition information.

FIG. 18 shows the experimental result when a symbol string to be searched was 'abcd'. As can be seen from this result, the effect of the present invention was slightly reduced when the number of types of symbols contained in the target symbol string increased. However, the processing time still greatly reduced to 1/5.3 to 1/8.4.

What is claimed is:

1. A symbol string search method of performing an approximate matching for a target symbol string from a symbol string to be searched by allowing insertion, deletion or replacement of symbols of not more than a designated number of times, comprising the steps of:

when $S(n)$, which indicates a matching state of said symbol string to be searched with respect to said target symbol string at respective appearance positions "n" in the symbol string to be searched in a direction of from its leading end to its tail end, is sequentially calculated, acquiring pieces of transposition information of the same symbols as those contained in the target symbol string from pieces of transposition information in which appearance positions "n" of symbols in a preformed symbol string to be searched are stored; and determining said $S(n)$ by using a length "m" indicating an appearance position in the acquired transposition information and $S(n-m)$ in case that the appearance position in said acquired transposition information becomes discontinuous.

2. A method claimed in claim 1, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

3. A symbol string search apparatus for performing an approximate matching for a target symbol string from a symbol string to be searched by allowing insertion, deletion or replacement of symbols of not more than a designated number of times, comprising a processor and storage media coupled to the processor and storing programming code for performing processing comprising:

when $S(n)$, which indicates a matching state of said symbol string to be searched with respect to said target symbol string at respective appearance positions "n" in the symbol string to be searched in a direction of from its leading end to its tail end, is sequentially calculated, acquiring pieces of transposition information of the same symbols as those contained in the target symbol string from pieces of transposition information in which appearance positions "n" of symbols in a preformed symbol string to be searched are stored; and determining said $s(n)$ by using a length "m" indicating an appearance position in the acquired transposition information and $S(n-m)$ in case that the appearance position in said acquired transposition information becomes discontinuous.

4. An apparatus claimed in claim 3, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

5. A recording medium recording a program for allowing a computer to execute a symbol string search processing for performing an approximate matching for a target symbol string from a symbol string to be searched by allowing insertion, deletion or replacement of symbols of not more than a designated number of times, said symbol string search processing comprising:

when $S(n)$, which indicates a matching state of said symbol string to be searched with respect to said target symbol string at respective appearance positions "n" in the symbol string to be searched in a direction of from its leading end to its tail end, is sequentially calculated, processing for acquiring pieces of transposition information of the same symbols as those contained in the target symbol string from pieces of transposition information in which appearance positions "n" of symbols in a preformed symbol string to be searched are stored; and processing for determining said S(n) by using a length "m" indicating an appearance position in the acquired transposition information and S(n−m) in case that the appearance position in said acquired transposition information becomes discontinuous.

6. A medium claimed in claim 5, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

7. A symbol string search apparatus, comprising:
(a) a transposition information storage section for storing appearance positions "n" of respective symbols in a symbol string to be searched;
(b) a transposition information formation section for extracting the appearance positions "n" of respective symbols in a symbol string to be searched and storing the extracted appearance positions in said transposition information storage section;
(c) a transposition information acquisition section for acquiring pieces of transposition information of the same symbols as those contained in a target symbol string from said transposition information storage section; and
(d) a collation processor for performing an arithmetic operation for the acquired pieces of transition information and outputting a position of a target symbol string contained in the symbol string to be searched,
wherein, when S(n) indicating a matching state of said symbol string to be searched with respect to said target symbol string at respective appearance positions "n" in the symbol string to be searched in a direction of from its leading end to its tail end is sequentially calculated, said collation processor includes a scanning processor for determining said S(n) by using a length "m" indicating an appearance position in the acquired transposition information and S(n−m) in case that the appearance position in said acquired transposition information becomes discontinuous.

8. A symbol string search apparatus claimed in claim 7, wherein said collation processor comprises a transposition information arrangement section for arranging the pieces of transposition information acquired by said transposition information acquisition section in order of appearance in an original symbol string to be searched, and said scanning processor uses said pieces of transposition information arranged by said transposition information arrangement section.

9. An apparatus claimed in claim 8, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

10. An apparatus claimed in claim 7, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

11. A symbol string search method of performing an approximate matching for a target symbol string from a symbol string to be searched by allowing insertion, deletion or replacement of symbols of not more than a designated number of times, comprising the steps of:
when S(n), which indicates a matching state of said symbol string to be searched with respect to said target symbol string at respective appearance positions "n" in the symbol string to be searched in a direction of from its leading end to its tail end, is sequentially calculated,
acquiring pieces of transposition information of the same symbols as those contained in the target symbol string from pieces of transposition information in which appearance positions "n" of symbols in a preformed symbol string to be searched are stored;
determining said S(n) by using a result of comparing the symbols contained in the target symbol string with symbols at the respective positions "n" in the symbol string to be searched and S(n−1) in case that the appearance position of said acquired transposition information becomes continuous; and
determining said S(n) by using a length "m" indicating an appearance position in the acquired transposition information and S(n−m) in case that the appearance position in said acquired transposition information becomes discontinuous.

12. A method claimed in claim 11, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

13. A symbol string search apparatus for performing an approximate matching for a target symbol string from a symbol string to be searched by allowing insertion, deletion or replacement of symbols of not more than a designated number of times, comprising a processor and storage media coupled to the processor and storing programming code for performing processing comprising:
when S(n), which indicates a matching state of said symbol string to be searched with respect to said target symbol string at respective appearance positions "n" in the symbol string to be searched in a direction of from its leading end to its tail end, is sequentially calculated,
acquiring pieces of transposition information of the same symbols as those contained in the target symbol string from pieces of transposition information in which appearance positions "n" of symbols in a preformed symbol string to be searched are stored;
determining said S(n) by using a result of comparing the symbols contained in the target symbol string with symbols at the respective positions "n" in the symbol string to be searched and S(n−1) in case that the appearance position of said acquired transposition information becomes continuous; and
determining said S(n) by using a length "m" indicating an appearance position in the acquired transposition information and S(n−m) in case that the appearance position in said acquired transposition information becomes discontinuous.

14. An apparatus claimed in claim 13, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

15. A recording medium recording a program for allowing a computer to execute a symbol string search processing for performing an approximate matching for a target symbol string from a symbol string to be searched by allowing insertion, deletion or replacement of symbols of not more than a designated number of times, said symbol string search processing comprising:

when $S(n)$, which indicates a matching state of said symbol string to be searched with respect to said target symbol string at respective appearance positions "n" in the symbol string to be searched in a direction of from its leading end to its tail end, is sequentially calculated, processing for acquiring pieces of transposition information of the same symbols as those contained in the target symbol string from pieces of transposition information in which appearance positions "n" of symbols in a preformed symbol string to be searched are stored; and processing for determining said $S(n)$ by using a result of comparing the symbols contained in the target symbol string with symbols at the respective positions "n" in the symbol string to be searched and $S(n-1)$ in case that the appearance position of said acquired transposition information becomes continuous; and processing for determining said $S(n)$ by using a length "m" indicating an appearance position in the acquired transposition information and $S(n-m)$ in case that the appearance position in said acquired transposition information becomes discontinuous.

16. A medium claimed in claim 15, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

17. A symbol string search apparatus, comprising:

(a) a transposition information storage section for storing appearance positions "n" of respective symbols in a symbol string to be searched;

(b) a transposition information formation section for extracting the appearance positions "n" of respective symbols in a symbol string to be searched and storing the extracted appearance positions in said transposition information storage section;

(c) a transposition information acquisition section for acquiring pieces of transposition information of the same symbols as those contained in a target symbol string from said transposition information storage section; and (d) a collation processor for performing an arithmetic operation for the acquired pieces of transition information and outputting a position of a target symbol string contained in the symbol string to be searched, wherein, when $S(n)$ indicating a matching state of said symbol string to be searched with respect to said target symbol string at respective appearance positions "n" in the symbol string to be searched in a direction of from its leading end to its tail end is sequentially calculated, said collation processor includes a scanning processor for determining said $S(n)$ by using a result of comparing the symbols contained in the target symbol string with symbols at the respective positions "n" in the symbol string to be searched and $S(n-1)$ in case that the appearance position of said acquired transposition information becomes continuous and determining said $S(n)$ by using a length "m" indicating an appearance position in the acquired transposition information and $S(n-m)$ in case that the appearance position in said acquired transposition information becomes discontinuous.

18. A symbol string search apparatus claimed in claim 17, wherein said collation processor comprises a transposition information arrangement section for arranging the pieces of transposition information acquired by said transposition information acquisition section in order of appearance in an original symbol string to be searched, and said scanning processor uses said pieces of transposition information arranged by said transposition information arrangement section.

19. An apparatus claimed in claim 18, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

20. An apparatus claimed in claim 17, wherein the target symbol string is at least one selected from a group consisting of a character string, a symbolized sound and a symbolized image and, on the other hand, the symbol string to be searched is at least one selected from a group consisting of a character string, a symbolized sound and a symbolized image.

* * * * *